United States Patent Office 3,608,119
Patented Sept. 28, 1971

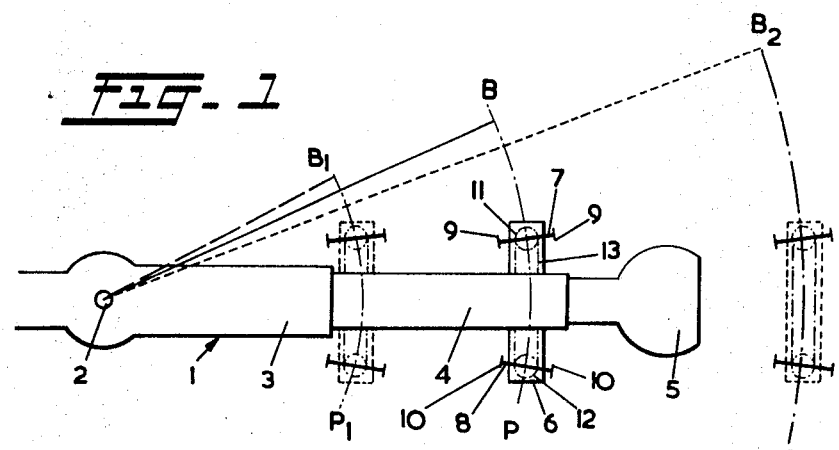
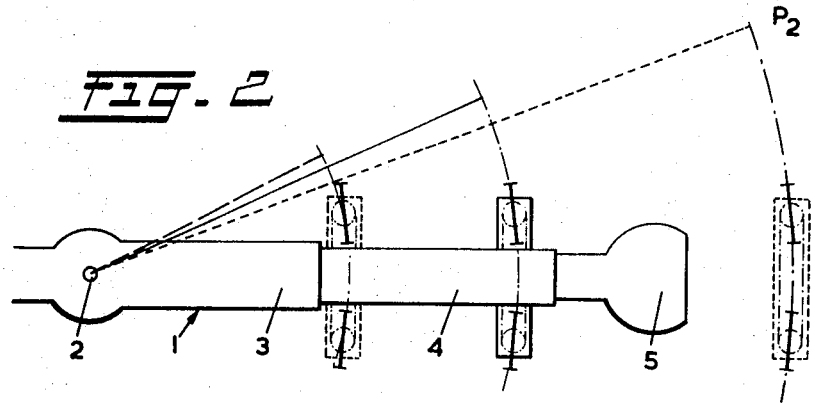
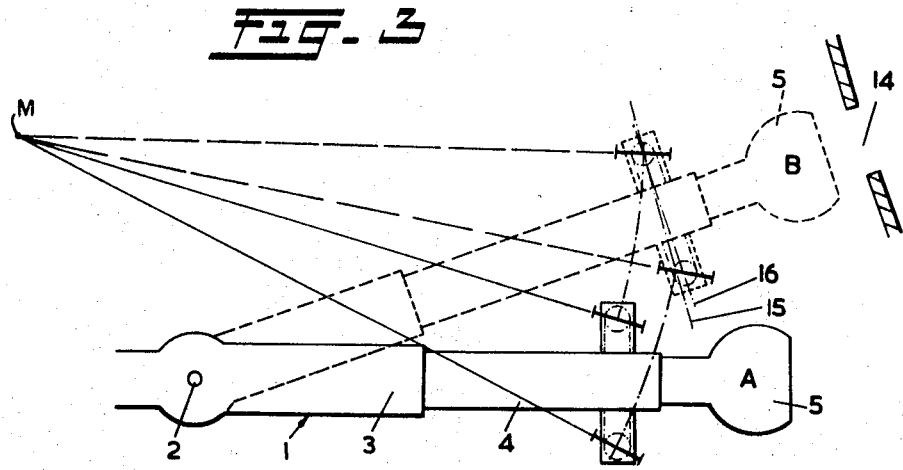

3,608,119
TRUCK FOR TELESCOPING AIRPORT JETTY
Nicolaas Gradus Jan Willem van Marle, Dordrecht, Netherlands, assignor to Aviolanda Maatschappij voor Vliegluigbouw N.V., Papendrecht, Netherlands
Filed Mar. 21, 1969, Ser. No. 809,208
Claims priority, application Netherlands, Mar. 22, 1968, 6804096
Int. Cl. B65g *11/00*
U.S. Cl. 14—71          1 Claim

ABSTRACT OF THE DISCLOSURE

A truck for a telescoping airport jetty pivotable about a vertical axis, said truck having at least two substructures steerable about vertical axes and each including at least one road wheel or road wheel assembly, wherein the substructures of the truck are coupled to be steered at all times through the same angle and in the same sense of rotation, the angular position of the axes of rotation of the road wheels being such that, when the substructures are adjusted for true pivoting movement of the jetty, the axes of rotation of the road wheels slightly converge in the direction of the pivoting axis of the jetty.

---

This invention relates to a truck for a telescoping airport jetty pivotable about a vertical axis, said truck axes each including at least one road wheel or road wheel assembly.

A truck of this kind is disclosed in my co-pending application U.S. Ser. No. 767,922, filed Oct. 7, 1968. In it, each substructure has two co-axially mounted wheels. The substructures of the truck described in said application can be steered into either a position in which the axes of the wheels are in alignment with each other for telescoping movement of the jetty, during which all wheels truly roll along a path parallel to the longitudinal direction of the jetty, or a position for true pivoting movement of the jetty, during which the wheels follow a circular path with the pivoting axis of the jetty as its centre.

A disadvantage of this steering system is that telescoping and pivoting movements of the jetty cannot take place at the same time, because a relative position of the substructures intermediate the above-described main positions for true radial movement and for true circumferential movement will result in such a deviation from a true rolling track of the wheels, in other words in such considerable wheel slippage as to cause intolerable forces and wear.

It is an object of the present invention to eliminate this disadvantage and to provide a steerable truck for an airport jetty, which makes it possible for the jetty to be simultaneously telescoped and pivoted in a simple manner.

To that effect, according to the invention, the substructures of the truck are so coupled, as far as their steering is concerned, that they are at all times adjusted through the same angle and in the same sense of rotation, the angular position of the axes of rotation of the road wheels relative to each other being such that, when the substructures are adjusted for true pivoting movement of the jetty, the axes of rotation of the road wheels slightly converge in the direction of the pivoting axis of the jetty.

This implies that it is only upon true pivoting movement of the jetty with the truck in a certain radial position, that a true rolling movement of the wheels in a circular path having its centre in the pivoting axis of the jetty can be obtained, whereas, if the truck occupies a position radially more outward or inward relative to said given position, the wheels will exhibit lateral slippage. The above-described selected relative angular position of the substructures also implies that, in the position for true telescoping movement of the jetty, the substructures, i.e. the axes of rotation of the substructures, will be out of alignment with each other, i.e. the axes of rotation of the wheels of one substructure will make an angle with those of the other substructure, which angle is slightly different from an angle of 180°. Therefore, even during true telescoping movement there will be slippage of the wheels.

It has been found, however, that such slippage is perfectly acceptable, during true pivoting movement and true telescoping movement, as well as during simultaneous pivoting and telescoping movements as far as the generated counter-forces or wear is concerned.

The preferred angle between the axes of rotation of the wheels is such that when the truck is at a distance from the pivoting axis of the jetty about twice its minimum distance from said axis, the axes of rotation of the wheels intersect each other in the pivoting axis of the jetty in the position for true pivoting movement of the jetty.

With such an angular position, approximately equal maximums of slippage will occur during true pivoting movement with the truck at the smallest radial distance from the pivoting axis and during true telescoping movement, while slippage will be less than said maximums during all combined movements, i.e. during any simultaneous pivoting and telescoping.

The result is that the jetty truck according to the invention can be used in all positions, the jetty being steered in a continuous movement from its fully retracted starting position to the position necessary for connection with an airplane.

One embodiment of the invention will now be described, by way of example, with reference to the accompanying drawings, in which FIG. 1 is a diagrammatic plan view of an airport jetty adapted for pivoting and telescoping movements in a generally horizontal plane with the substructures of the jetty truck in their position for true pivoting movement;

FIG. 2 is a diagrammatic plan view according to FIG. 1, but with the substructures of the jetty truck in a position for true telescoping movement; and FIG. 3 is a diagrammatic plan view according to FIG. 1, with the substructures in a position in which the jetty has been simultaneously pivoted and telescoped to a second indicated position.

Referring to the drawings, there is shown an airport jetty 1 movable in a horizontal plane about a vertical axis 2. The jetty comprises telescoping tubes 3 and 4, the latter having a connecting end 5. The tube 4 is supported by a rectangular truck 6, to which it is fixedly connected. The truck has on each of its ends a substructure 7, 8, each steerable about a vertical axis and having an assembly of two parallel road wheels 9, 10. In the position P as shown, which is intermediate the extreme radial positions of the truck 6, the positions of the substructures are such that the axes of rotation of the wheels 9, 10 intersect each other in the pivoting axis 2 of the jetty 1. In all positions, the substructures are coupled to be steered in a 1 to 1 ratio and in the same sense of rotation, for example, by virtue of each substructure 7, 8 having a disk 11, 12, fixedly connected to it, with a common cable 13 being lapped about said disks.

As a result of this connection of the substructures, rotation of one of them, which may be effective, for example, by means of a conventional steering motor or any other suitable steering drive, will cause the other to be adjusted through the same angle and in the same sense of rotation. During true pivoting movement of the jetty 1, in the position of the truck 6 as shown, the wheels 9, 10 will describe a circular path B whose centre is located in the pivoting axis 2, the wheels performing true rolling motion. In the dotted, radially inward position P1 of the truck 6, the substructures have the same position as in the position P, which is also the case in the radially outward position P2, at least if the operator intends to have the jetty perform a true pivoting movement. During such a true pivoting movement, the wheels of the substructure will be forced to follow a circular path whose centre is in the pivoting axis 2 of the jetty, but slippage will occur during such movement, namely, inward slippage in the radially inward position, and outward slippage in the radially outward position. It has been found that with a suitable selection of the angle which the axes of rotation of the wheels of the substructures make with each other, the slippage is technically and economically fully acceptable in all steering positions other than the above-described main positions.

FIG. 3 shows a steering position of the substructures intermediate the main positions described, in which the connecting end 5 of the jetty 1 has been adjusted from a position A to a position B opposite an opening 14 in the hull of an airplane. In the steering position of the substructures as shown, the axes of rotation of the wheels intersect each other in a point M. If the jetty truck could have moved in accordance with this steering position, its axis would have the position 15, indicated in dot-dash lines. The actual position of the truck is positively determined by the angular position of the jetty as a whole. As a matter of fact, the truck makes a fixed angle with the longitudinal direction of the jetty, at least in the horizontal plane, so that the truck actually comes to assume the position as shown. The small difference between the axes 15 and 16 shows that only an extremely small amount of slippage has occurred.

Although the embodiment described has two substructures, the present invention is particularly suitable for a construction of a jetty having more than two substructures, and this because their steering would not become appreciably more complicated or expensive, since, as a matter of fact, the adjustment of the added substructures can also take place in a 1 to 1 ratio and in the same sense of rotation as the two extreme substructures.

The substructures can be driven for rolling movement in any known manner, for example from an electric or hydraulic motor incorporated in one or more substructures.

In a preferred embodiment of the jetty truck according to the invention, the substructures can be turned in both directions through 360° an unlimited number of times. The resulting advantage is that the steering motor need be switched to the other direction of rotation in fewer cases than would normally be the case.

We claim:

1. An airport jetty including at least first and second tubes telescopically related to each other, said first tube having a vertical pivot axis for allowing rotation of said first tube about said pivot axis in a horizontal plane, truck means supporting said second tube for movement between an extended position and a retracted position of said first and second tubes, said truck means including a pair of spaced substructure means one on each side of the longitudinal axis of said jetty, each of said substructure means being steerable about a respective vertical axis and each having a steering disk means fixedly connected thereto, cable means entrained about said steering disk means for rotating said substructure means equal angular amounts and in the same direction of rotation, and road wheel means carried by each said substructure means with the axes of rotation of said road wheel means intersecting each other at said vertical pivot axis only when said truck means is spaced from said pivot axis in a mean operative position intermediate said extended and retracted positions.

References Cited
UNITED STATES PATENTS

| | | | |
|---|---|---|---|
| 1,162,640 | 11/1915 | Morton | 180—50 |
| 2,384,092 | 9/1945 | Hollos | 180—50X |
| 2,598,863 | 6/1952 | Tucker | 180—50 |
| 2,612,090 | 9/1952 | Revers | 94—50 |
| 3,404,417 | 10/1968 | Wollard | 14—71 |
| 3,462,784 | 8/1969 | Seipos | 14—71 |

JACOB L. NACKENOFF, Primary Examiner

U.S. Cl. X.R.

180—50

PO-1050
(5/69)

UNITED STATES PATENT OFFICE
CERTIFICATE OF CORRECTION

Patent No. 3,608,119                   Dated September 28, 1971

Inventor(s) N. G. J. WILLEM VAN MARLE

It is certified that error appears in the above-identified patent and that said Letters Patent are hereby corrected as shown below:

Column 1, read line 5 as follows -- Vliegtuigbouw N.V., Papendrecht, Netherlands --

Signed and sealed this 9th day of May 1972.

(SEAL)
Attest:

EDWARD M.FLETCHER,JR.          ROBERT GOTTSCHALK
Attesting Officer               Commissioner of Patents